United States Patent [19]

Anderson et al.

[11] 3,768,648
[45] Oct. 30, 1973

[54] METHOD AND APPARATUS FOR SEPARATING SUSPENDED MATERIAL FROM A FLUID STREAM

[75] Inventors: John R. Anderson, Cranbury; William A. Beach, Milltown, both of N.J.

[73] Assignee: Sybron Corporation, Rochester, N.Y.

[22] Filed: July 21, 1972

[21] Appl. No.: 273,814

Related U.S. Application Data

[63] Continuation-in-part of Ser. No. 39,997, May 25, 1970, abandoned.

[30] Foreign Application Priority Data

Aug. 6, 1971   Germany.................. P 21 39 521.1

[52] U.S. Cl.................................. 210/83, 210/522
[51] Int. Cl............................................. B01d 21/10
[58] Field of Search ................. 210/51, 73, 83, 521, 210/522

[56] References Cited
UNITED STATES PATENTS

| | | |
|---|---|---|
| 3,552,554 | 1/1971 | Olgard ........................... 210/521 X |
| 2,673,451 | 3/1954 | Gariel ............................ 210/521 X |
| 3,385,439 | 5/1968 | Bach .............................. 210/522 X |
| 3,399,135 | 8/1968 | Conley, Jr. et al. ................. 210/42 |
| 2,104,050 | 1/1938 | Nibecker et al. .................... 210/521 |
| 3,491,892 | 1/1970 | McCann ........................... 210/521 |

Primary Examiner—Samih N. Zaharna
Assistant Examiner—F. F. Calvetti
Attorney—Theodore B. Roessel

[57] ABSTRACT

An improved settler assembly comprising a plurality of inclined passages of chevron cross-sectional configuration. The chevron configuration provides a higher critical flow rate than for passages of equal area and length but of conventional cross-sectional configuration such as square, circular, hexagonal and the like. A method of separating suspended material from a liquid is disclosed.

18 Claims, 6 Drawing Figures

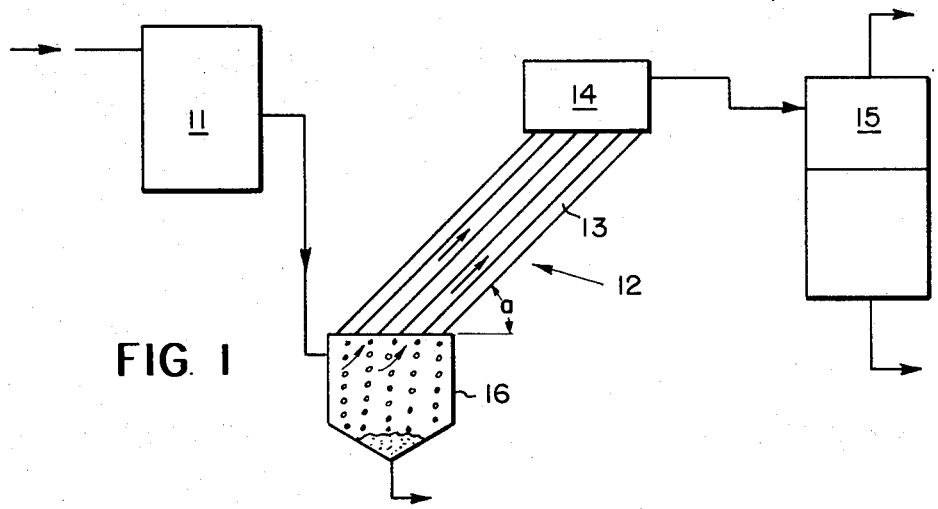
FIG. 1
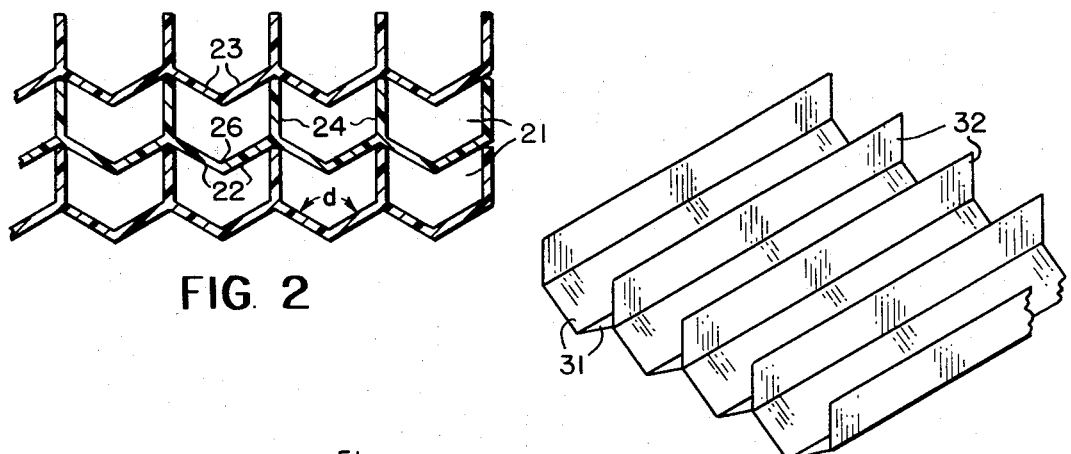
FIG. 2
FIG. 3
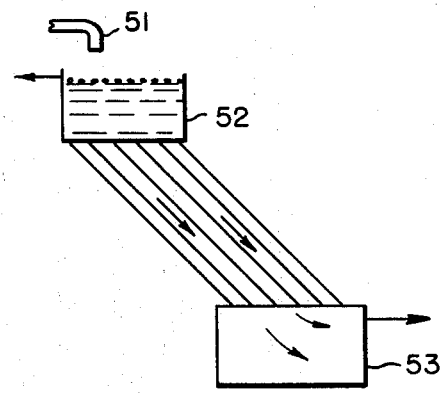
FIG. 4

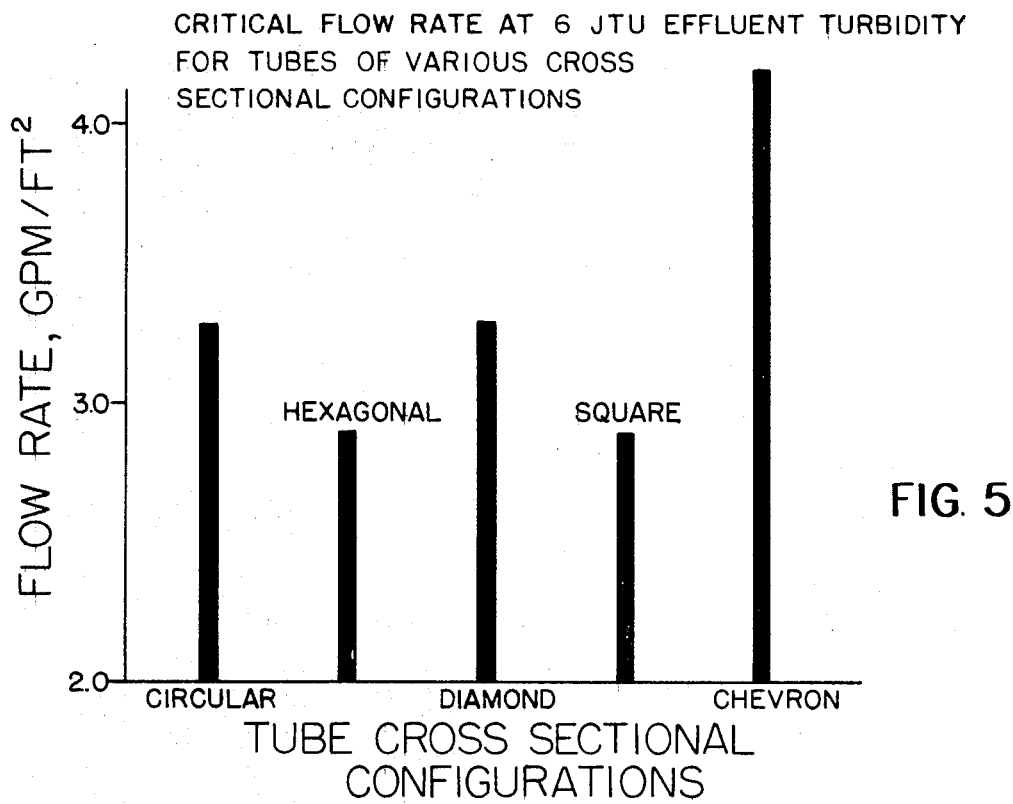
FIG. 5
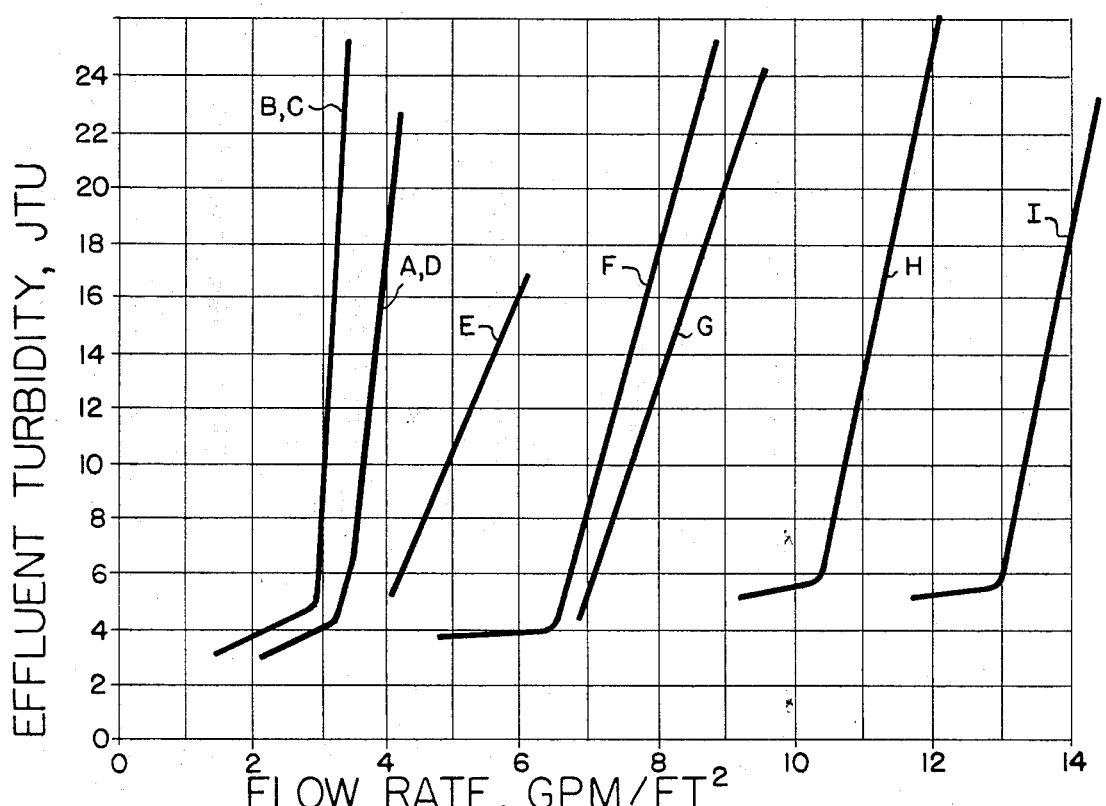
FIG. 6 CRITICAL FLOW RATE FOR TUBES OF VARIOUS CROSS SECTIONAL CONFIGURATIONS

METHOD AND APPARATUS FOR SEPARATING SUSPENDED MATERIAL FROM A FLUID STREAM

CROSS-REFERENCE TO RELATED APPLICATION

This application is a continuation-in-part of pending application Ser. No. 39,997, filed May 25, 1970, now abandoned.

FIELD OF THE INVENTION

This invention relates to the treatment of fluid stream containing suspended materials of different specific gravity from that of the fluid.

BACKGROUND OF THE INVENTION

The treatment of fluids, paticularly water, sewage wastes and the like normally requires the passage through a filter bed of some type during the treatment operation. Many such fluids being treated contain suspended particles of foreign matter which can be and should be removed prior to the filtering operation in order to avoid early clogging of the filter and subsequent reduction of efficiency of the treatment process. Accordingly, there is normally provided in most fluid treating processes a settling or a separation step where such suspended foreign materials are given the opportunity to settle or separate from the fluid being treated. Such settling or separation steps may be aided by chemical means such as the addition of alum or the like to form in combination with the suspended particles a floc which is of sufficient specfiic gravity to eventually settle out of the liquid if sufficient time is given. In a similar type operation, immiscible liquids can be separated such as for example, oil from water. Such operations, however, may require long periods of time in order to allow the suspended particles to separate from the fluid with the result that it is necessary to provide a sufficient number of substantially large holding tanks in which to maintain the fluid being treated during the settling or separation step.

It has been long known that the settling or separation step can be greatly improved if the fluid being treated is passed through a device known as a settler which normally comprises a vessel containing a plurality of baffles or plates across which the fluid being treated is caused to flow in a non-turbulent manner. The purpose of the baffles or plates is to reduce the turbulence and also to reduce the distance which a particle must fall and the spaces between the baffles or plates are normally restricted so that the depth of the fluid passing therethrough is substantially shallow and thereby substantially reduces the amount of fluid through which the particle must fall. The same is true if the suspended material has a specific gravity of less than the fluid being treated except that the particle will rise instead of fall. Although the passage of fluid to be treated through restricted passages defined by plates or baffles was sufficient for the purpose, it was later found that even better results could be achieved by passing the fluid to be treated through a plurality of parallel tubes or passages. The tubes or passages are generally positioned so as to lie at some angle to the horizontal with the lower end of the tube being the influent end and the upper end of the tube being the effluent end of the tube. The tubes are of sufficient length so that the suspended material is substantially removed by the time the fluid reaches the effluent end of the tube. The angle at which the tube reposes may be as small as 5° or as great as 80°. The advantage of larger angles is that the material settling out of the fluid to be treated will flow counter to the flow of the fluid thereby making the settling device substantially self-cleaning. Apparatus of this general type employing a tube or a plurality of tubes disposed at an angle to the horizontal is described in U. S. Pat. No. 3,399,135, Conley et al., U. S. Pat. No. 3,482,694, Rice et al., and French Pat. No. 746,980. Such devices, hereinafter referred to as tube settlers, have been found to have the following disadvantages. The shape of the tube, i.e., circular, square, triangular, hexagonal and elipsoid as presently described in the prior art does not provide for the concentration of separated matter into a compact mass within the tube. Accordingly, the separated matter has a relatively high surface area presented to the fluid passing through the tube and the separated matter lies in a relatively thin layer along the tube bottom. The high surface area results in resuspension of some of the separated matter. The failure to build a relatively thick layer of separated matter hinders the flow thereof counter to the flow of fluid passing through the tube because the layer is not sufficiently compact and insufficient mass is built up.

With the exception of a square tube, the commonly used tube shapes have a non-uniform height in cross-section. Thus, suspended particles located on the same plain across the cross-section of a circular or trangular shaped tube, for example, have a different thickness of fluid through which they must travel to reach the bottom of the tube depending on where they are located with respect to the axis of the tube. This results in non-uniform settling and ineffient use of settling area within the tube.

The hydraulic radius of the commonly used tube shape is relatively high and the corresponding Reynolds number for flow of a fluid through such tubes is high with the result that the through-put rate of fluid must be low in order to avoid turbulent flow. Turbulence must be avoided in order to achieve effective separation.

Accordingly, it is an object of this invention to provide a tube settler of improved design wherein maximum flow rate through the settler is substantially increased and effluent quality is maintained.

It is another object of this invention to provide a tube settler wherein the individual tubes of the tube settler provide a low hydraulic radius and a uniform height from top to bottom across the cross-section of the tube.

Yet another object of this invention is to provide accumulation of suspended material in a layer within the tube having a low surface fluid interface whereby improved counterflow between fluid and separated material is achieved.

These and other objects and advantages of this invention will be apparent upon consideration of the following detailed description and the drawings and the novel features thereof will be particularly pointed out hereinafter in connection with the appended claims.

BRIEF DESCRIPTION OF DRAWINGS

FIG. 1 is a schematic diagram of a typical water clarification apparatus employing the tube settler of this invention.

FIG. 2 is a cross-sectional view through line 2—2 of the settler apparatus illustrated in FIG. 1.

FIG. 3 shows in perspective a section of corrugated sheet which can be readily assembled to form the chevron passage module of this invention.

FIG. 4 is a schematic diagram of apparatus suitable for use in separating suspended matter where the suspended matter has a specific gravity less than the fluid being treated.

FIG. 5 is a bar graph showing the critical flow rate of tubes of equal area and length but of different cross sectional configurations.

FIG. 6 is a plot of 1 effluent turbidity versus flow rate for various tubes.

DESCRIPTION OF INVENTION

It has been found that settler assemblies having substantially improved operating characteristics are achieved in accordance with this invention when the passages of the settler are of a chevron cross-sectional configuration. It has been found that the chevron cross-sectional configuration has a low hydraulic radius for a given area as contrasted to passages of other shapes of substantially the same area. The resulting Reynolds number for flow through the passages of the settler assembly of this invention is low thus allowing laminar flow through the passage at much higher flow rates. Settler assemblies constructed in accordance with this invention produce a good quality effluent as measured by Jackson Turbidity Units (JTU) at flow rates in excess of flow rates acheived with conventional settler assemblies and have a critical flow rate on the order of about 25 – 40 percent higher than settlers having passages of conventional cross-sectional configuration.

The settler assembly of this invention is employed in any process wherein settlers or tube settlers are required, and with its ability to operate at substantially higher flow rates than conventional tube settlers while producing effluent of high quality, the settler assembly of this invention provides substantial savings of time for separating suspended material from fluids without loss of efficiency. The settler assembly of this invention can be economically fabricated and easily assembled in a lightwieght assembly.

Referring to FIG. 1, raw water containing suspended material is mixed with a chemical coagulant such as for example, alum and the mixture is introduced into flocculater 11 where it is held for sufficent time to allow for the formation of floc. The flocculated water is then led to the influent end of the settler assembly shown generally as 12 comprising a multiplicity of throughrunning passages 13 having a chevron cross-sectional configuration and inclined at an angle a to the horizontal. Angle a may range from as small as 5° to as much as 75° or 80° depending on the type of material to be separated from the water and depending on whether self-cleaning of the tubes is desired. Normally, at the smaller angles of inclination, backwashing of the settler is required to remove the separated material from the tube passages. If it is desired that the separated material is to flow down the tube counter to the flow of fluid, Angle a must be greater than the angle of repose of the separated material in order to insure the continuous counter flow of the separated material. The angle of repose is readily determined by one skilled in the art and depends among other things, upon the particle size and type of material being separated. Generally, if the passages are inclined at an angle of 60 ° or greater to the horizontal, the angle of repose of most separated material is overcome and good flow of settled material from the passage is achieved. All things being equal, it has that found the Angle a should be as small as possible consistent with the angle of repose of the material being separated for best results. The clarified water is collected in vessel 14 and is led away for service or for further treatment such as for example, filtering through filter 15. In the embodiment shown separated material flows counter to the flow of fluid and is discharged at the influent end of the settler assembly and is accumulated in the lower portion of sludge collection tank 16 for periodic or continuous removal therefrom.

Referring to FIG. 2, the settler assembly 13 of FIG. 1 comprises a plurality of individual passages 21 each having a chevron cross-sectional configuration. The number of passages 21 in the settler assembly depends on the total volume of fluid to be treated and the design capacity of the apparatus. A major factor in determining design capacity of a tube settler, is the critical flow rate for the individual passages. As used herein, critical flow rate is the maximum rate of flow in gallons per minute per square foot through a tube of defined height, area, perimeter and length at which effective removal of suspended particles will take place. When flow rate is plotted against effluent turbidity, as in FIG. 6 it will be seen that at or above the critical flow rate, a very slight rise in flow rate will produce a increase in effluent turbidity on the order of 10 to 20 fold. Accordingly, it is highly preferred that a settler be operated at or below the critical flow rate in order to maintain effective effluent quality.

An important factor in determining the critical flow rate of a passage shape is the ratio of passage perimeter to the passage area. The higher the ratio the higher the maximum flow rate for passages of equal length. The chevron shaped passage of this invention provides the highest perimeter to area ratio for a given area as compared to passages of other shapes of the same area. Set forth below the Table A are the perimeter to area ratios of a variety of passage shapes, all passages having an area of 5.66 square inches.

TABLE A

| SHAPE | Perimeter/Area Ratio (inches/inch$^2$) |
|---|---|
| Circle | 1.48 |
| Hexagon | 1.57 |
| Square | 1.68 |
| Diamond | 1.68 |
| Chevron | 2.12 |

Another factor in producing good quality effluent is the ratio of the length of the passage to the height of the passage. Reducing the height of the passage with respect to its length will improve settling performance. As a practical matter, however, it is preferred that the passage height be on the order of 1 – 3 inches for most operations since passages under about 1 inch in height have a tendency to become fouled by the settled material. Increasing the height beyond about 3 inches lowers the critical flow rate of the passage unless the length of the tube is correspondingly increased. For the average size unit, the passage length will range between 1 – 5 feet. It should be clear, however, that the passages and resulting settler assemblies of this invention can be scaled up or down in area end length depending on the design capacity of the apparatus.

In FIG. 2 it can be seen that the individual chevron passages are defined by a V shaped bottom wall 22 which defines interior angle $d$, a V shaped top wall 23, and side walls 24. The apex of the V of bottom wall 22 defines a sludge groove 26 in which material settled from the fluid being treated is accumulated and moved counter to the flow of the fluid. Sludge groove 26 allows the settled material to accumulate with an appreciable thickness which tends to increase the mass of the material contained in sludge groove 26 and facilitates movement of the material counter to the flow of the fluid through the tube. The non-uniform accumulation of settled material in sludge groove 26 of bottom wall 22 reduces the surface area of the accumulated material exposed to fluid flow thereby reducing the risk of resuspending some of the material. This is to be contrasted with the case if the tubes were square or otherwise had a flat bottom and the settled material uniformly accumulated in a thin blanket along the bottom wall. The interior angle $d$ formed within passages 21 by V shaped with 22 and 23 may range from 10° to 179° depending on the type of material being separated from the liquid. Good results have been obtained when this angle is on the order of 90° and this is the preferred angle.

Referring now to FIG. 3, a convenient method for fabricating and assembling the settler asembly of this invention consists of first forming a corrugated sheet 31 and providing vertically extending strips 32 along each alternate corrugation apex in the manner shown. The currugated sheets and vertically extending strips can be conveniently formed by extruding polyvinyl chloride or other suitable extrudable material or may be formed by tacking metal strips on to corrugated metal sheet. Extruded plastic is highly preferred because fabrication is inexpensive and the resulting products are lightweight, strong and chemically resistant. The settler assembly is then formed by vertically stacking the corrugated sheets so that the V's of the corrugations are vertically aligned and the upper sheet rests on the upper edge of the vertically extending strips 32 of a lower sheet to maintain the sheets in spaced apart relationship. The upper and lower sheets and vertically extending strips define individual fluid passages of chevron cross-sectional configuration. When assembled in the manner shown, it can be see that the corrugated sheet 31 shown in FIG. 3 has side walls 24 formed by vertically extending strips 32 and the bottom surface of the next vertically stacked corrugated sheet forms the upper V shaped wall 23 of the tubes 21 as shown in FIG. 2. The stacked corrugated sheets are conveniently fixed in place by any suitable means such as a suitable adhesive or tape in the case of plastic extrusions or by welding or soldering or mechanical fasteners in the case of metal. It will be clear that the number of passages in the assembled settler and the number of stacked corrugated sheets used as well as the size of the passages formed when the settler is assembled can be varied depending on the size of the unit and the design capacity. In its finally assembled condition, the settler assembly is in the form of a rhomoboid having parallel passages and all of the passage lengths of the assembly are equal.

It should be clear, however, that the settler assembly may consist of chevron passages where the passages are not parallel but are instead arranged so as to radiate outwardly from the axis of the assembly as in a frusto-conical or inverted frusto-conical form. In this arrangement, the passages are equi-length and are disposed at the same angle to the horizontal.

Referring to FIG. 4, there is shown another embodiment of this invention wherein the tube settler is provided for the separation of suspended materials having a specific gravity less than that of the fluid being treated. In this case the same operation and design principles are involved as previously described. An example of a use for such a device would be the separation of oil from water where the oil-water mixture is introduced through pipe 51 and the water-oil mixture is caused to flow downwardly through the settler assembly at the rate less than the critical flow rate so that the suspended material flows upwardly in receiving tank 52 and the clarified water flows downwardly into effluent tank 53 and to service or further processing as may be required. It should be clear, however, that when using the settler assembly to separate suspended material having a specific gravity less than the fluid being treated that the chevron passages are inverted with respect to their position as shown in FIG. 2 so that the interior angle of the upper wall of the passage defines the sludge groove. Also the influent end is on a horizontal plane above the effluent end of the settler and fluid to be treated is directed downwardly through the apparatus. As for apparatus previously described, the tube settler is disposed at an angle greater than the angle of repose of the settled material if the self cleaning feature is desired.

The following example demonstrates the higher critical flow rate for tubes of chevron cross section as compared to tubes of equal area and length but of different cross sectional configieration

EXAMPLE I

Tubes of various cross sectional configurations in square, diamond hexagonal and circular were selected for testing against a chevron tube. The tubes were constructed of galvanized steel and each tube was dimensioned so as to have a cross sectional area of 5.66 inches$^2$ and a length of 2 feet. The test procedure was carried out by positioning the tube being tested in a precipitator tank at an angle of 60° from the horizontal with the influent end of the tube below the surface of water and the effluent and projecting above the water surface. The effluent end of the tube was connected to siphon line so that the rate of flow through the tube could be accurately controlled and samples readily taken for turbidity measurements.

Water to be treated was introduced into the precipitator tank at a rate of at least 50 percent greater than the designed flow rate of the precipitator tank to insure that no settling occurred in the precipitator tank itself and to insure that suspended material was carried out of the tank unless drawn into the tube being tested. Water and suspended material which passed out of the precipitator tank without being drawn into a tube was collected and led back into the tank so that all tubes were tested with the same water and suspended material thus allowing a direct comparison of settling efficiency between all of the tested tubes.

Water and suspended material was drawn into the tube being tested at increasing flow rate increments and each flow rate increment was maintained for at least 30 minutes to insure that equilibrium conditions for that flow rate had been reached. In the tests, flow of sludge was counter to the flow of liquid. Equilibrium conditions were reached when the turbidity of the effluent from the tested tube remained constant for two samples taken at 15 minute intervals.

The test water consisted of well water treated with sufficient lime to provide a pH of 7 and to which was added 50 ppm alarm. A suspension was induced by adding kaolin to the thus treated water until the turbidity measured 100 JTU's.

The critical flow rate of each tube was determined by drawing test water through the tube in increasing flow rate increments, as described above, until the effluent turbidity reached 6 JTU's. The flow rate in gallons per minute per square foot of area when effluent turbidity was reached 6 JTU's was reported as the critical flow rate. The turbidity of 6 JTU's was selected as a turbidity above which treated water would be considered as unacceptable for subsequent filtering and treatment operations.

The dimensions of the tubes tested are set forth in Table B below. The critical flow rate for the tubes tested are set forth in Table B and are further graphically shown by the bar graph of FIG. 5 which is plot of critical flow rate for each tube cross sectional configuration.

TABLE B

| Test | Cross Section | Dimension (inch) | Area (inch²) | Length (feet) | Critical flow gpm/ft² |
|---|---|---|---|---|---|
| A | Circular | 2.68 Diameter | 5.66 | 2 | 3.3 |
| B | Hexagonal | 1.48 each side | 5.66 | 2 | 2.9 |
| C | Square | 2.38 each side | 5.66 | 2 | 2.9 |
| D | Diamond | 2.38 each side | 5.66 | 2 | 3.3 |
| E | Chevron | 2.0 each side | 5.66 | 2 | 4.2 |

EXAMPLE II

Critical flow rate tests were conducted in the manner of Example I using the same test conditions as described therein. The individual tubes tested were all of chevron cross sectional configuration but the dimensions of the tubes were varied to show the effect on the critical flow rate when tube length is increased and when the ratio of diagonal side dimension to vertical side dimension is increased. The test results are summarized in table C below.

TABLE C

| Test | Dimension (inch) | Area (inch²) | Length (feet) | Critical Flow Rate (gpm/ft²) |
|---|---|---|---|---|
| F | 1.0 vertical side 2.0 diagonal side | 2.83 | 2 | 6.7 |
| G | 2.0 each side | 5.66 | 4 | 7.1 |
| H | 1.0 vertical side 2.0 diagonal side | 2.83 | 4 | 10.3 |
| I | 1.0 each side | 1.41 | 4 | 13.0 |

The tests run on each tube in Examples I and II are identified as Test A through Test I, and the results for each test are plotted in FIG. 6 as Effluent Turbidity against Flow Rate.

Curves A-E of FIG. 6 are a plot of the results of Example I while curves F-I are a plot of the results of tests run in Example II.

Critical flow rate is considered as an important measure of tube performance since it indicates the maximum flow through a tube to maintain a selected quality of effluent. A high critical flow rate allows for the design of a settler assembly which can be smaller than a conventional settler assembly for a given flow rate. In addition, a high critical flow rate will allow for the design of a settler assembly of conventional size which will permit a higher flow through without loss of effluent quality.

In the operation of the chevron tube settler of this invention the tubes are oriented so that the side walls are vertically disposed and the apices of the V shaped top and bottom walls are in vertical alignment. In this manner the chevron configuration further provides a uniform distance from top to bottom at any point along the passage thus providing uniform settling conditions throughout the passage. The sludge groove provided by the chevron passages prevents the resuspension of the accumulated settled material and allows the settler assembly to be operated at angles closer to the angle of repose of the settled material thereby improving efficiency of the settler. The settler of this invention can be easily fabricated and assembled and in its preferred embodiment the apparatus of this invention is lightweight and strong.

While the foregoing description of the invention has been restricted primarily to embodiments of the invention where the flow of liquid is counter to the flow of material which has settled out of the liquid it is within the scope of this invention to employ the chevron tubes in settler where flow of liquid and settled material are co-current. In employing the settler of this invention in such a manner the liquid and suspended material will or lead into the influent ends of the settler assembly which will be disposed above the effluent end. The liquid and suspended material will flow co-currently down the passages where settling will take place in accordance with the principles previously discussed for counter current flow. In co-current flow, however, means must be provided at the effluent ends of the passages to separate the settled material from the liquid. Such means includes extending the bottom V shaped wall of each tube to a solids collection area.

In the foregoing description the invention has been described with reference to certain particular preferred embodiments, though it is to be understood that the specific details shown are merely illustrative and that the invention may be carried out in other ways without departing from the true spirit and scope of the appended claims.

We claim:

1. Apparatus for removing material suspended in a liquid comprising a settler assembly having influent and effluent end, and means communicating with said influent and effluent ends respectively for continuously introducing liquid containing suspended material to said settler assembly and for leading liquid away from said settler assembly, the improvement which comprises said settler assembly comprising a plurality of inclined throughrunning passages of chevron cross-sectional configuration through the entire length thereof communicating with said influent and effluent means, each of said passages being defined by vertical side walls and upper and lower V shaped walls, the apices thereof being vertically aligned and the interior angle formed within said passage by a V shaped wall defining a groove for collecting material separated from said liquid.

2. The apparatus of claim 1 wherein said throughrunning passages are parallel.

3. The apparatus of claim 1 wherein said throughrunning passages are radially outwardly disposed with respect to the axis of said assembly.

4. The apparatus of claim 1 wherein said effluent end of said assembly is on a horizontal plane above said influent end and said liquid stream is directed upwardly through said passages.

5. The apparatus of claim 4 wherein said bottom "V" shaped wall of said passages defines a groove wherein suspended material in said liquid having a density greater than said liquid settles therefrom and accumulates in said groove.

6. The apparatus of claim 4 wherein said assembly is disposed at an angle greater than the angle of repose for said material settled from said liquid whereby said settled material moves in a direction counter to the liquid flow and is discharged from said influent end of said assembly.

7. The apparatus of claim 1 wherein said effluent end is on a horizontal plane below said influent end and said liquid stream is directed downwardly through said passages.

8. The apparatus of claim 7 wherein said upper V shaped wall of said passages defines a groove wherein suspended material in said liquid having a density less than said liquid rises therefrom and accumulates in said groove.

9. The apparatus of claim 7 wherein said assembly is disposed at an angle greater than the angle of repose for said material settled from said liquid whereby said settled material moves in a direction counter to the liquid flow and is discharged from said influent end of said assembly.

10. The apparatus of claim 1 wherein said settler assembly is in the form of a rhomboid whereby said throughrunning passages are equi-length.

11. The apparatus of claim 1 wherein said settler assembly is frusto-conical in form and said throughrunning passages are equi-length.

12. The apparatus of claim 1 wherein said internal angle defining said groove ranges between 10° and 179°.

13. A method for separating settleable suspended material from a liquid comprising the steps of providing a settler assembly having an influent end and an effluent end and comprising a plurality of inclined passages of chevron cross-sectional configuration, introducing liquid containing settleable suspended material to the influent end of said settler assembly, flowing said liquid through said passage at a flow rate of not more than the critical flow rate of said passage whereby material suspended in said liquid settles out of said liquid in said passage while said liquid is flowing therethrough and leading said liquid away from said effluent end of said settler assembly.

14. The method of claim 13 wherein said passages are inclined at an angle greater than the angle of repose of said material in said passage and said material settled in each of said passages flows through said passages counter to the flow of said liquid and leaves said settler assembly at the influent end thereof.

15. The method of claim 13 wherein said passages are inclined at an angle of 60° to the horizontal.

16. The method of claim 13 wherein the settleable suspended material has a specific gravity greater than said liquid and said influent end of said inclined settler assembly is below said effluent end.

17. The method of claim 13 wherein the settleable suspended material has a specific gravity less than said liquid and said influent end of said inclined assembly is above said effluent end.

18. The method of claim 13 wherein said influent end of said inclined settler assembly is above said effluent end and said liquid and said material which has settled out of said liquid flow co-currently through said passages and said material leaves said settler assembly at the effluent end thereof.

* * * * *